United States Patent
Martynov (10) Patent No.: US 9,916,220 B2
(45) Date of Patent: Mar. 13, 2018

(54) SMART LOGGING OF TRACE DATA FOR STORAGE SYSTEMS

(71) Applicant: EMC Corporation, Hopkinton, MA (US)

(72) Inventor: Alexey Valeryevich Martynov, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 30 days.

(21) Appl. No.: 14/902,100

(22) PCT Filed: Mar. 26, 2015

(86) PCT No.: PCT/RU2015/000178
§ 371 (c)(1),
(2) Date: Dec. 30, 2015

(87) PCT Pub. No.: WO2016/153377
PCT Pub. Date: Sep. 29, 2016

(65) Prior Publication Data
US 2017/0109258 A1    Apr. 20, 2017

(51) Int. Cl.
*G06F 9/44* (2006.01)
*G06F 9/45* (2006.01)
*G06F 9/445* (2006.01)
*G06F 11/36* (2006.01)
*G06F 11/07* (2006.01)

(52) U.S. Cl.
CPC ...... *G06F 11/3636* (2013.01); *G06F 11/0706* (2013.01); *G06F 11/0778* (2013.01); *G06F 11/0754* (2013.01); *G06F 11/3664* (2013.01)

(58) Field of Classification Search
CPC ............ G06F 11/3636; G06F 11/0706; G06F 11/0778; G06F 11/0754; G06F 11/3664
See application file for complete search history.

(56) References Cited

U.S. PATENT DOCUMENTS

| 8,181,161 | B2 * | 5/2012 | Kollmann | ........... | G06F 11/3476 |
| | | | | | 714/45 |
| 9,489,282 | B2 * | 11/2016 | Longobardi | ........ | G06F 11/1471 |
| 2002/0087949 | A1 * | 7/2002 | Golender | ............. | G06F 9/4446 |
| | | | | | 717/124 |
| 2005/0039078 | A1 | 2/2005 | Bradley et al. | | |
| 2007/0220361 | A1 | 9/2007 | Barnum et al. | | |

(Continued)

OTHER PUBLICATIONS

Joseph Amrith Raj, WebSphere Application Server v8 Primer, High Performance Extensible Logging, Joseph's websphere library, WebSphere Application Server v8 Primer, part-7: High Performance Extensible Logging [HPEL] May 25, 2012, pp. 1-14.*

(Continued)

*Primary Examiner* — Thuy Dao
*Assistant Examiner* — Mongbao Nguyen
(74) *Attorney, Agent, or Firm* — BrainwoodHuang (57) ABSTRACT

An improved technique for storing trace data involves storing software operation debug trace information in a buffer memory rather than in a log file in the main memory, and after completion of the software operation either (1) deleting the debug trace information upon the successful completion of the operation, or (2) transferring the debug trace information to a log file memory upon a failure of the operation.

13 Claims, 4 Drawing Sheets

(56) References Cited

U.S. PATENT DOCUMENTS

| | | | |
|---|---|---|---|
| 2008/0209443 A1* | 8/2008 | Suzuki | G06F 11/3636 719/318 |
| 2009/0089622 A1* | 4/2009 | Qi | G06F 11/3636 714/38.13 |
| 2009/0119548 A1* | 5/2009 | Kollmann | G06F 11/3476 714/45 |
| 2010/0083052 A1* | 4/2010 | Huber | G06F 11/0709 714/45 |
| 2011/0131561 A1* | 6/2011 | Adams, III | G06F 8/4434 717/159 |
| 2011/0289360 A1 | 11/2011 | Cathro | |
| 2013/0145350 A1* | 6/2013 | Marinescu | G06F 11/3636 717/128 |
| 2013/0159977 A1* | 6/2013 | Crosetto | G06F 11/3636 717/128 |
| 2013/0318505 A1* | 11/2013 | Rhee | G06F 11/3636 717/128 |
| 2014/0006874 A1* | 1/2014 | Bohling | G06F 11/3476 714/45 |
| 2014/0095846 A1* | 4/2014 | Mayer | G06F 11/3476 712/227 |
| 2014/0215151 A1* | 7/2014 | Yasuhara | G06F 3/0619 711/114 |
| 2014/0282428 A1* | 9/2014 | Andre | G06F 11/3636 717/128 |
| 2014/0365833 A1* | 12/2014 | Bourne | G06F 11/3636 714/45 |
| 2015/0006869 A1* | 1/2015 | Ehrlich | G06F 11/3636 712/244 |
| 2015/0212925 A1* | 7/2015 | Granshaw | G06F 9/546 717/128 |
| 2016/0011893 A1* | 1/2016 | Strong | G06F 9/45533 718/1 |
| 2016/0041894 A1* | 2/2016 | Reid, III | G06F 11/3636 714/45 |
| 2016/0170820 A1* | 6/2016 | Strong | G06F 11/3466 714/37 |

OTHER PUBLICATIONS

Raja R. Sambasivan, So, you want to trace your distributed system? Key design insights from years of practical experience, pp. 1-19, 2014 (Year: 2014).*

Chun Hui Suen, S2Logger: End-to-End Data Tracking Mechanism for Cloud Data Provenance, pp. 594-602, 2013 (Year: 2013).*

Kanasz Robert, SMO Tutorial 4 of n-Transferring Data and Tracing, pp. 1-10, 2012 (Year: 2012).*

International Search Report for PCT/RU 2015/000178, mailed from Federal Institute of Industrial Property dated Jan. 28, 2016, pp. 1-7.

* cited by examiner

SMART LOGGING OF TRACE DATA FOR STORAGE SYSTEMS

BACKGROUND

Complex electronic systems, such as data storage systems, typically run a large number of processes during a typical operation. Software utilized to execute these processes may be accordingly complex and large in scope. Developing software for electronic systems involves writing code and then testing the operation of the code in the electronic system to determine if the system performs as desired while running the software.

Some complex electronic systems send process data to a management system for tracking and analysis. For example, management software such as Unisphere® by EMC Corporation of Hopkinton, Mass., tracks and analyzes the data storage system's response to storage requests received over various time periods. In order to properly debug the software, the operation of the electronic system is traced so that each step in producing the final result is available for a software developer to analyze. Conventional techniques of debugging software configured to run processes within complex systems involve storing trace data in a log file within a management system. The trace data is then available to a developer should the need to debug the software arise, e.g., in response to a software-related failure.

SUMMARY

Unfortunately, the conventional techniques of debugging software during development phases requires a very large amount of memory to store all of the trace data in the log file, which increases cost and decreases the amount of time that the trace data can be stored. The tracing generally results in large amounts of trace data which must be stored in a log file, and includes low level information such as the values of all parameters needed for the software developer to analyze all possible software errors. Since every possible parameter value is stored at each and every step of the program operation, the size of the log file may be very large, and consequently the length of time that the trace data may be economically stored may be short.

In contrast with the above-described conventional techniques which produce excessively large log files, improved techniques of debugging software configured to run processes within complex systems involve storing software operation debug trace information temporarily in a buffer memory, and when the software operation is completed evaluating the success of the operation and transmitting the debug trace data to different locations depending upon the result. For example, the temporarily stored trace data that accumulated in the buffer prior to the completion of the software operation may be either (1) deleted from the buffer memory upon the successful completion of the operation, or (2) transferred to a log file memory configured to store errors, warnings, and informational messages upon a failure of the operation. For example, the processing of storage requests in a data storage system may be continuously monitored by a management computer. The management computer receives data resulting from operation of the data storage system and generates various log data. The management computer will also send information that will become the debug data that represents every parameter and function passed into and out of the storage system during operation, and well as every value of every state variable. While the errors, warnings, and informational messages are stored in the log file memory, the trace data is first stored in a buffer until the management software deems the operation has been completed successfully or has either not be completed within a certain time period or has been completed unsuccessfully and flags a problem. For example, if a store operation has successfully stored the desired data in the correct location of a memory and all the indications are within the proper limits, then the trace data in the buffer may be released or deleted.

Advantageously, the improved techniques reduce the amount of log file size required by only storing information useful in failure analysis. In certain cases the debug trace information may be set to have all of the trace data accumulated in the buffer transmitted to the log file whether or not the operation succeeded during a software development phase. After the completion of the software development phase, for example in a product release phase, the accumulated trace data may only be transmitted to the log file when the operation fails for failure analysis purposes. The technique reduces the amount of log file memory required to perform software development or operational phases by only storing information useful for failure analysis. Such improved techniques reduce log file size during the software development phase and may be useful during the product release phase for improved failure analysis capabilities.

Embodiments of the improved techniques include a computer program product having a non-transitory computer readable medium which stores a set of instructions for storing and managing trace data from an operation performed in an electronic system. The set of instructions causing a managing computer to perform a method, the method comprising receiving trace data resulting from an operation performed by an electronic system in communication with the management computer, and storing the trace data in a buffer memory in communication with the management computer. When the management computer receives notice that a status of the operation is in a first state, the method includes transferring the trace data to a first location, and when the status of the operation is in a second state transferring the trace data to a second location. The first state may indicate that the operation has been completed in a state that has not achieved specified limits, and consequently the operation has failed and the first location may be a log file memory where the trace data is stored more permanently than in the buffer memory, which may be cleared after the transfer to the log file memory. The second state may indicate that the operation has been completed in a state that has achieved specified limits, and consequently the operation has been successful. The second location may be a delete location where the trace data is dumped, and the buffer memory may be cleared for a next operation. The management computer analyzes the trace data to determine if the operation was completed successfully in part by searching the trace data to locate a software exception thrown by a processor of the electronic system, which indicated that the operation did not successfully complete, and as a result the trace data should be transferred to a log file for further analysis.

Other embodiments include an electronic apparatus including a network interface, a buffer memory, a memory and processing circuitry coupled to the network interface the memory and the buffer memory. The memory storing instructions which, when carried out by the processing circuitry, cause the processing circuitry to receive trace data from an electronic operation in an electronic system in communication with the processing circuitry at the buffer memory. The instructions will cause the processing circuitry to determine the status of the operation and when in a first state indicating that the operation did not complete successfully transfer the trace data to a log file portion of the memory. When the status of the operation is in a second state indicating that the operation completed successfully deleting the trace data thereby reducing the log file memory capacity needed to store trace data.

Other embodiments of the improved technique includes a method of reducing memory requirements including receiving, at a processor, trace data for an electronic operation, receiving information on the status of the electronic operation, transferring the trace data to a log file memory when the status indicate completion of the electronic operation outside of specified limits, and deleting the trace data when the status indicate completion of the electronic operation within the specified limits.

Other embodiments of the improved techniques may be imagined and include apparatus, device, system components and circuitry enabled to trace software operations in electronic devices and either store trace data for operations that have been completed outside of desired limits and may have problems that will benefit from further analysis, or delete trace data for operations that have completed within the desired limits, thus reducing memory space requirements for electronic systems. Although the improved techniques have been described using an example of storage software development and failure analysis, the techniques may also be applied to any complex system, for example, process development and production monitoring for a manufacturing line such as a semiconductor fabrication facility. In such a manufacturing facility the product produced is measured and the results recorded at hundreds of steps along the fabrication flow, and the data storage facility requirements are high and may be reduced by use of the improved techniques for smart logging of trace data.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique for storing trace data involves storing software operation debug trace data temporarily in a buffer memory rather than storing the trace data directly in a log file in the main memory. After completion of the software operation the technique will either (1) delete the debug trace data upon successful completion of the operation, or (2) transfer the debug trace data to a log file memory upon failure of the operation. For example, when a piece of new software is in a development phase a data storage system operating on the newly developed software may be continuously monitored by a computer configured to manage software operations. The management computer receives data resulting from development operation, generates various log data, and also generates debug data that includes every parameter and function passed into and out of the storage system during operation, and every value of every state variable. This trace data is used by the software developer to improve the software, and is stored in a log file. However, the size of log file may become very large. In order to reduce the size of the log file in the development phase the improved technique stores the trace data a buffer memory until the management software deems the operation has been completed. The trace data in the buffer memory then either transfers the trace data to the log file if the management software determines that the operation is outside of acceptable limits, or deletes the trace information if the management software determines that the operation is within the acceptable limits. The improved technique reduces the log file size required by only storing information useful in failure analysis.

The debug trace information may alternatively be set to transmit all information to the log file whether or not the operation was completed within the specified limits during a software development phase, or the debug trace data may be set to only transmit the debug trace data when the operation fails during a product release or an operational use phase for use in failure analysis. The technique reduces the amount of log file memory required to perform software development or to perform failure analysis in an operational phase, by only storing information useful for failure analysis. Such improved techniques reduce log file size during both the software development phase as well as during the product release phase for improved failure analysis capability.

Figure 1:
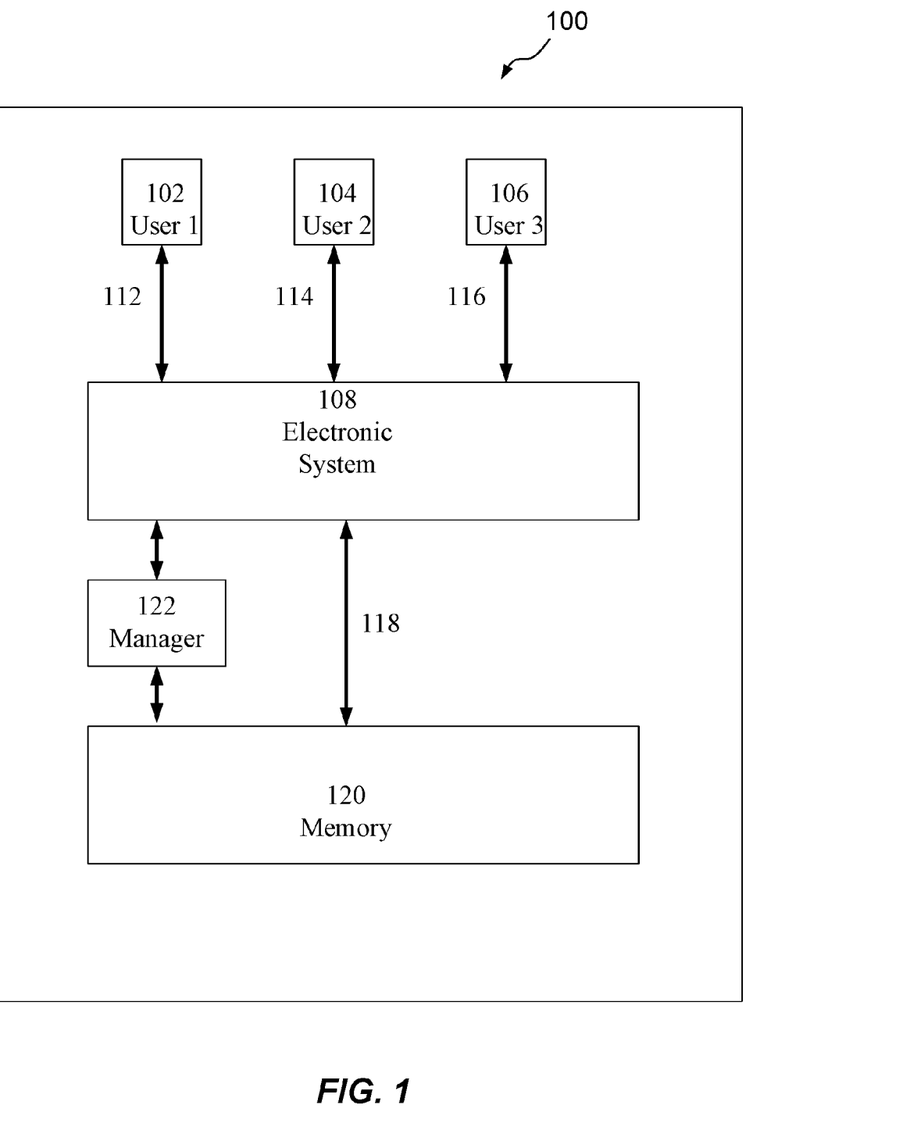
FIG. 1 is a line drawing illustrating an electronic environment where the improved technique may be implemented.

FIG. 1 illustrates an electronic environment 100 where the improved technique may be implemented. Electronic environment 100 includes a complex electronic system 108 and a memory 120 connected to users 102, 104 and 106 by bidirectional communication media 112, 114 and 116 respectively. The complex electronic system 108 may be a storage processor such as may be used in large memory systems. Users 102, 104 and 106 may be using electronic devices such as computers, servers, personal computers, tablets, smart phones, commercial computer systems, financial computer systems and other easily imagined electronic systems. Users 102, 104 and 106 may, for example, transfer data either to or from the memory 120 via the storage processor 108 and bidirectional communications line 118. The communications lines may be wired or wireless, use electrical, optical or RF signals, and may include any form of communication capable of transmitting information between electronic devices.

The storing and fetching of data between the users and the memory 120 may be subject to errors and these errors may be more likely to occur during development of new software programs. The activity of the electronic environment 100 may be detected and analyzed by a manager 122, which may have a separate set of communications lines or may be connected to the existing communications line 118. The manager 122 may be a management computer such as the Unisphere® system made by EMC Corporation of Hopkinton Mass. In this description the manager 122 is shown as having separate communications lines for greater simplicity of description, but the improved techniques are not so limited. The manager 122 can examine every parameter and every value of every state variable at each individual software step of an operation in the storage processor 108, for example, a store command from user 102 to record an item of information in a location in the memory 120. The manager 122 can store every detail of the store operation; determine whether or not the operation is complete; and determine whether or not the operation completed without any errors. This data is called trace data.

The manager 122 includes a buffer memory in which the trace data for the store operation is accumulated while the store operation occurs. The buffer memory may be included within the manager 122 or on a separate device. The manager 122 may be a separate device as shown, or it might be a portion of the storage processor 108 or of some other electronic device. The manager 122 includes memory containing acceptable limits for the completion of the operations likely to occur in the environment 100. Using these limits the manager 122 determines whether or not the operation was completed within the limits, (i.e., successfully completed or not). Many possible successful completion metrics may be imagined to determine if a software operation has been completed properly, including various programming language mechanisms, such as a C++ exception, or logging facility calls such as logger.errorDetected, or a timeout limit for total operational length.

The manager 122 may transfer the accumulated trace data for the operation at the end of the determination of operation success, or the manager 122 may wait until enough operations have been completed to reach a limit of the memory capacity of the buffer memory. Transferring the combined trace data of the operations at a single time with a single write call is more efficient and results in lower overhead for the system. The increased efficiency of transferring accumulated trace data for an operation in a single write rather than the prior method of storing the trace data in the log file in memory 120 as the traced data is gathered is another benefit of the improved technique.

After completion of the operation the manager 122 evaluates the trace data and transfers the trace data to a selected location in memory 120, such as a log file, if the evaluation indicates that the operation did not complete properly, for example, not within the specified limits. Thus problems with the software or hardware may be available for failure analysis. Alternatively, the manager 122 may erase the trace data, effectively transferring the trace data to a dump location if the evaluation indicates that the operation was completed within the specified limits. The manager 122 may also send a notice to a selected location to identify selected completion states, or the manager may collect data on the results of the all the operation success determinations over a period of time.

Figure 2:
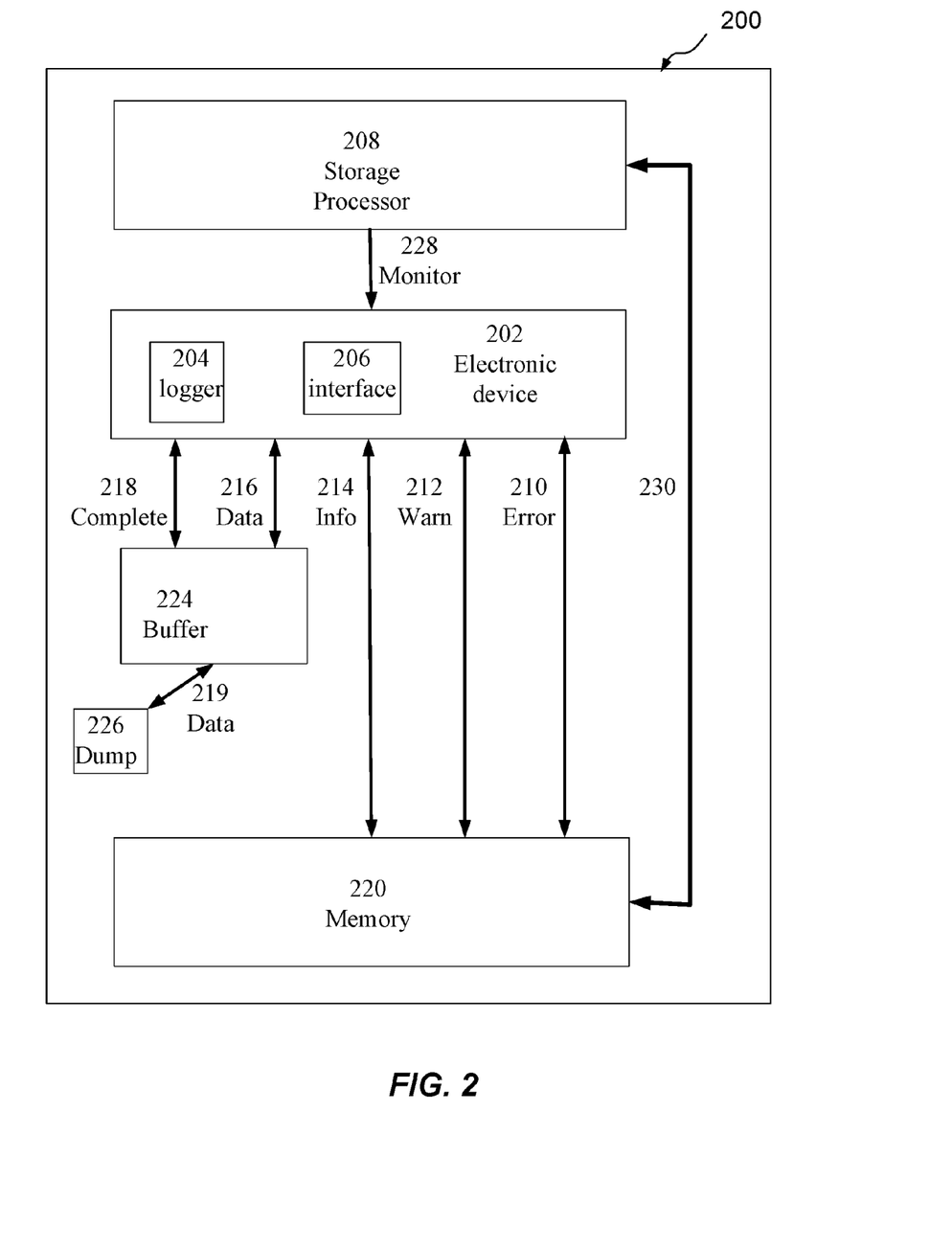
FIG. 2 is a line drawing illustrating an implementation of the improved technique in a first condition.

FIG. 2 is a line drawing illustrating an implementation of the improved technique in a first condition in environment 200, with a storage processor 208 (used as an example of a complex electronic device) in communication with a memory 220 via communication line 230, and with a plurality of users (not shown) as previously discussed. Monitoring storage processor 208 via monitor communication line 228, an electronic device 202, for example the manager 122 previously discussed with reference to FIG. 1, collects information about the operations of the storage processor 208. The electronic device 202 may collect information such as error indications from the storage processor 208, which the electronic device 202 transfers using an interface circuit 206 to a location in memory 220, for example a log file, via communication signal 210. In similar fashion warning signals and other information are transferred by the electronic device 202 to the log file in memory 220.

Trace data from the operation occurring in the storage processor 208 may be collected by a logger circuit 204 and transferred to a buffer memory 224 via a data communication line 216. The buffer 224 is shown as a separate device in this illustration for ease of description, but the improved technique is not so limited, and the buffer may be located in the electronic device 202 or anywhere else that is convenient. The buffer 224 accumulates the trace data as the operation proceeds as discussed previously until the electronic device 202 logger circuit 204 sends the buffer 224 a operation complete signal via communication line 218. Evaluation circuitry in the electronic device 202 or in the buffer 224 determines whether or not the condition of the completed operation is within the specified limits. In the first condition shown in this figure the completed operation has been found to be within the specified limits and is deemed to be successful and the trace data is erased, as indicated by the transferring of the trace data via communication line 219 to the dump 226.

In this example of the improved technique it is assumed that successfully completed operations are not needed for failure analysis and thus may be deleted to save memory space, but the technique is not so limited and the electronic device 202 may be configured to save all trace data for other easily imagined reasons.

Figure 3:
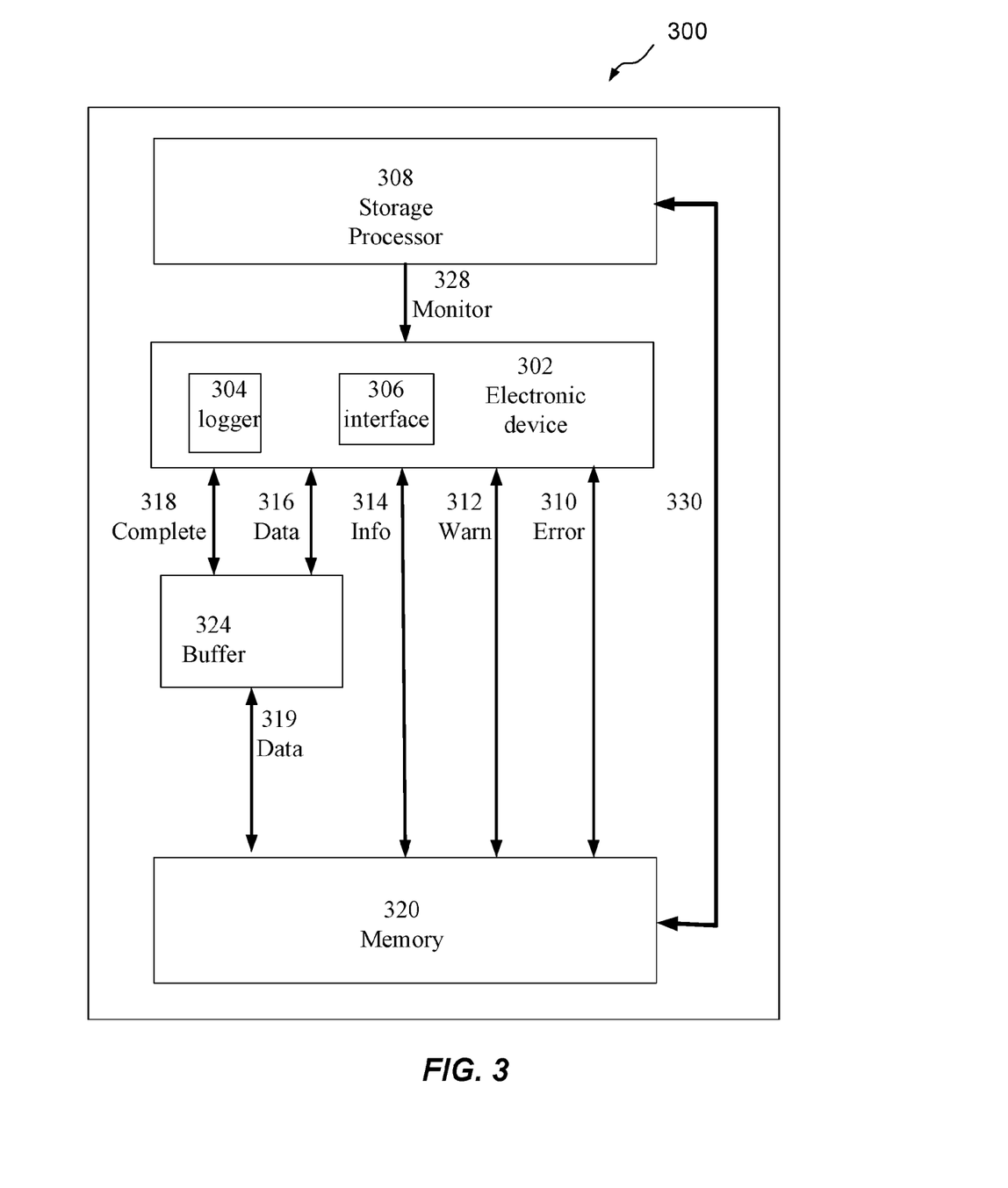
FIG. 3 is a line drawing illustrating an implementation of the improved technique in a second condition.

FIG. 3 is a line drawing illustrating an implementation of the improved technique in a second condition where the trace data accumulated in the buffer 324 has been analyzed by the electronic device 302 and the operation found to have been completed outside of the specified limits and thus a failure that may be of interest in failure analysis. In this situation the trace data is transferred to a log file in the memory 320 via communication line 319. In other embodiments of the improved technique the trace data may be erased from the buffer memory after being transferred to the log file, or it may be transferred to an additional location depending upon the results of the analysis, or it may be data compressed and continue to be stored in the buffer 324.

Figure 4:
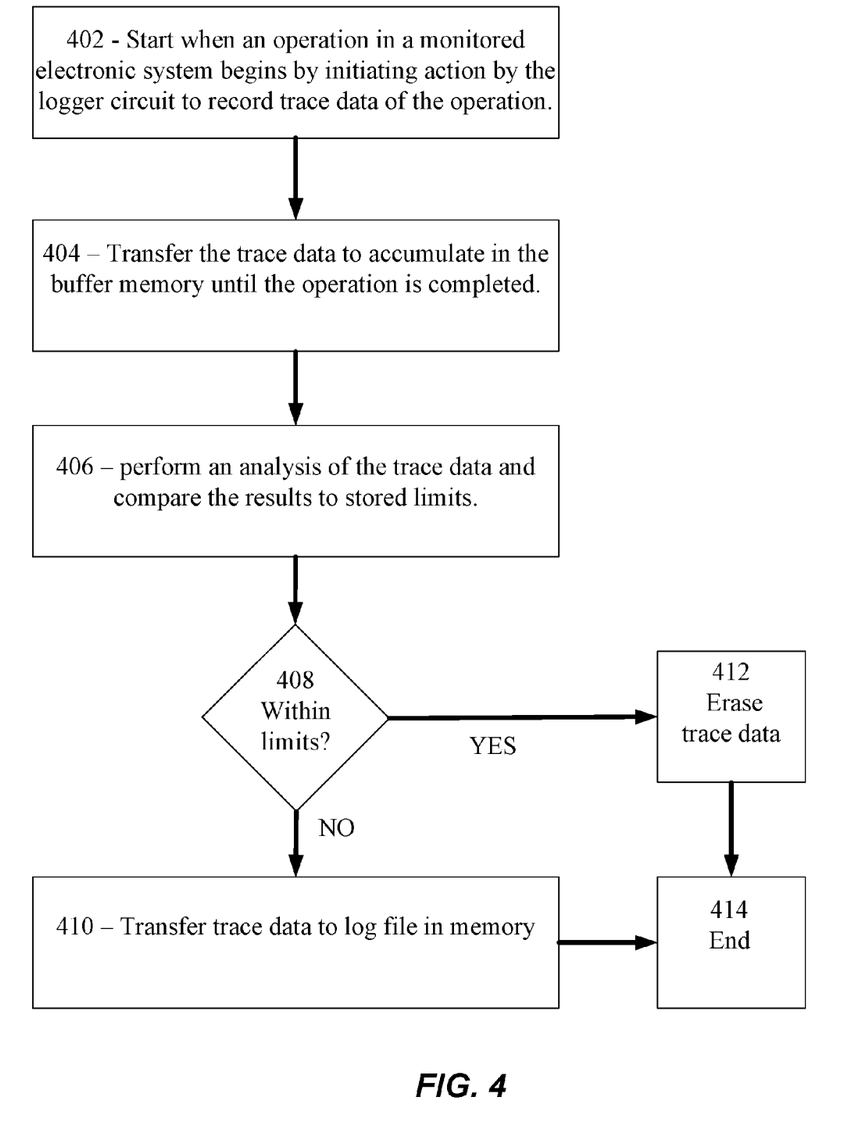
FIG. 4 is a flow chart illustrating the step of an exemplary operation using the improved technique.

FIG. 4 is a flow chart illustrating the steps of an example method including the improved technique. At 402, the electronic device 202 of FIG. 2 initiates the logger circuit 204 to record trace data of an operation occurring in the storage processor 208. The operation may be a read request from a user for data stored in a memory 220.

At 404, the trace data accumulates in a buffer 224 until the operation is completed. At 406, the electronic device 202 performs an analysis on the trace data in the buffer 224 to determine if the operation was completed within specified limits.

At 408, the electronic device 202 transfers the trace data to a memory 220. At 410, the analysis shows that the operation was completed outside of the specified limits and transfers the trace data to a log file, which may be located in memory 220. The method then ends at 414. If the analysis shows that the operation was completed within the specified limits the method may erase the trace data at step 412, and end at 414.

With such a technique storing trace data can include only storing trace data of operations that are of interest in failure analysis. The technique may be implemented in software which may be located in the electronic device to be evaluated, such as a storage processor, or in a monitoring computer evaluating the operation of a storage system.

While various embodiments of the invention have been particularly shown and described, it will be understood by those skilled in the art that various changes in form and details may be made therein without departing from the spirit and scope of the invention as defined by the appended claims.

What is claimed is:

1. A method, executed by a processor, of reducing memory requirements, comprising:
   receiving, at the processor, trace data for an electronic operation performed by an electronic system in communication with the processor;
   storing the trace data in a buffer memory in communication with the processor;
   receiving information on a status of the electronic operation;
   transferring the trace data from the buffer memory to a log file memory when the status indicates completion of the electronic operation outside of specified limits; and
   deleting the trace data when the status indicates completion of the electronic operation within the specified limits,
   wherein the method further comprises:
   analyzing the trace data, by the processor, to locate a software exception thrown by a processor of the electronic system, a presence of the software exception indicating that the operation did not complete successfully;
   storing the trace data in the log file memory when the software exception was located in the trace data; and
   deleting the trace data when the software exception was not located in the trace data.

2. The method of claim 1 wherein receiving the trace data includes a separate buffer memory for accumulating the trace data until a completion of the electronic operation is indicated by the processor, and transferring the trace data to the log file memory includes transferring all of the trace data in a single operation.

3. The method of claim 2 wherein transferring the trace data to the log file memory is delayed until accumulating the trace data results in a data file that reaches a predetermined size limit for the buffer memory.

4. The method of claim 2 wherein the data trace includes a debug trace for developing software in a storage system.

5. An electronic apparatus, comprising:
   a network interface;
   a buffer memory;
   a memory; and
   processing circuitry coupled to the network interface, the memory and the buffer memory, the memory storing instructions which, when carried out by the processing circuitry, cause the processing circuitry to:
   receive trace data from an electronic operation in an electronic system in communication with the processing circuitry at the buffer memory;
   when a status of the electronic operation is in a first state, transfer the trace data from the buffer memory to a first location;
   when the status of the electronic operation is in a second state, transfer the trace data to a second location different from the first location thereby reducing the log file memory capacity needed to store trace data,
   wherein first location includes a log file memory, and the processing circuitry caused to transfer the trace data to the second location is further caused to delete the trace data,
   wherein the first state indicates that the operation did not complete successfully and the second state indicates that the operation completed successfully; and
   wherein the processing circuitry further performs the steps of:
   analyzing the trace data to locate a software exception thrown by a processor of the electronic system, a presence of the software exception indicating that the operation did not complete successfully;
   storing the trace data in the log file memory when the software exception was located in the trace data; and
   deleting the trace data when the software exception was not located in the trace data.

6. The electronic apparatus of claim 5 further including the processing circuitry formatting the trace data in the log file memory the same as a formatting in the buffer memory.

7. A computer program product having a non-transitory computer readable medium which stores instructions for managing trace data resulting from operations performed by electronic systems, the set of instructions causing a management computer to perform a method, the method comprising:
   receiving trace data resulting from an operation performed by an electronic system in communication with the management computer;
   storing the trace data in a buffer memory in communication with the management computer;
   when the operation is in a first state, transferring the trace data from the buffer memory to a first location; and
   when the operation is in a second state, transferring the trace data to a second location apart from the first location,
   wherein transferring the trace data to a first location includes transferring the trace data to a log file memory, and transferring the trace data to a second location includes deleting the trace data,
   wherein the first state indicates that the operation did not complete successfully and the second state indicates that the operation completed successfully; and
   wherein the method further comprises:
   analyzing the trace data to locate a software exception thrown by a processor of the electronic system, a presence of the software exception indicating that the operation did not complete successfully;
   storing the trace data in the log file memory when the software exception was located in the trace data; and
   deleting the trace data when the software exception was not located in the trace data.

8. The computer program product of claim 7, further including formatting the trace data in the log file memory the same as a formatting in the buffer memory.

9. The computer program product of claim 7, wherein transferring the trace data to the log file memory is delayed until a number of smaller operations are accumulated into a group having a storage memory size that is smaller than a memory size of the buffer memory.

10. The computer program product of claim 7, wherein storing the trace data in the buffer memory further includes extending a size of the buffer memory for an operation including a trace data set that exceeds a size of the buffer memory.

11. The method of claim 7, wherein the operation is one of multiple operations performed by the electronic system, and wherein transferring the trace data from the buffer memory to the first location is performed after completion of the operation.

12. The method of claim 11, wherein the management computer includes a logger circuit and evaluation circuitry, and wherein the method further comprises:

issuing, by the logger circuit, an operation complete signal upon completion of the operation; and generating, by the evaluation circuitry in response to the operation complete signal, an indication that the operation is in the first state.

13. The method of claim 12, wherein the electronic system includes a storage processor of a data storage system, and wherein the operation is a store operation performed by the storage processor in response to a store command received from an electronic device operated by a user.

* * * * *